United States Patent
Sang et al.

(10) Patent No.: US 9,699,347 B2
(45) Date of Patent: Jul. 4, 2017

(54) DISPLAY APPARATUS AND METHOD

(75) Inventors: Jun-gyun Sang, Seoul (KR); Hye-jin Kim, Seoul (KR); Wan-je Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 13/596,442

(22) Filed: Aug. 28, 2012

(65) Prior Publication Data

US 2013/0155100 A1   Jun. 20, 2013

(30) Foreign Application Priority Data

Dec. 16, 2011   (KR) .................. 10-2011-0136562

(51) Int. Cl.
| | | |
|---|---|---|
| G09G 5/00 | (2006.01) | |
| H04N 1/21 | (2006.01) | |
| H04N 5/232 | (2006.01) | |
| H04N 21/435 | (2011.01) | |

(52) U.S. Cl.
CPC ......... H04N 1/212 (2013.01); H04N 5/23293 (2013.01); H04N 21/4355 (2013.01)

(58) Field of Classification Search
CPC .............................. G06T 11/20; G06T 19/00
USPC ....................................................... 345/619
See application file for complete search history.

(56) References Cited

U.S. PATENT DOCUMENTS

| | | | |
|---|---|---|---|
| 5,926,218 A * | 7/1999 | Smith .................... | 348/207.99 |
| 6,154,771 A * | 11/2000 | Rangan et al. ........... | 709/217 |
| 7,251,790 B1 * | 7/2007 | Drucker et al. .............. | 715/838 |
| 2001/0014202 A1 | 8/2001 | Honda et al. | |
| 2003/0190143 A1 * | 10/2003 | Girgensohn et al. .......... | 386/55 |
| 2003/0229894 A1 | 12/2003 | Okada et al. | |
| 2005/0188326 A1 * | 8/2005 | Ikeda ........................... | 715/788 |
| 2006/0069998 A1 * | 3/2006 | Artman et al. ................ | 715/721 |
| 2008/0152298 A1 * | 6/2008 | Ubillos ................ | G11B 27/034 386/282 |
| 2009/0172543 A1 * | 7/2009 | Cronin ................ | G06F 3/04847 715/721 |
| 2010/0088646 A1 * | 4/2010 | Nishimori et al. ........... | 715/838 |
| 2010/0180222 A1 * | 7/2010 | Otsuka et al. ................ | 715/768 |

(Continued)

FOREIGN PATENT DOCUMENTS

| | | |
|---|---|---|
| EP | 1 513 151 A1 | 3/2005 |
| EP | 1 783 772 A2 | 5/2007 |

(Continued)

OTHER PUBLICATIONS

Bjork, S., Bretan, I., Danielsson, R., and Karlgren, J. WEST: A Web Browser for Small Terminals. In Proc. UIST 1999, pp. 187-196.*

(Continued)

*Primary Examiner* — Jin Ge
(74) *Attorney, Agent, or Firm* — Drinker Biddle & Reath LLP

(57) ABSTRACT

A display apparatus and method. A display apparatus including a display control unit configured to display a moving image on a first region of a display screen; and a thumbnail generation unit configured to generate a plurality of thumbnail images based on a plurality of still images related to the moving image, wherein the display control unit is configured to display the plurality of thumbnail images on a second region of the display screen.

20 Claims, 19 Drawing Sheets

(56) References Cited

U.S. PATENT DOCUMENTS

| | | | | |
|---|---|---|---|---|
| 2010/0281372 A1* | 11/2010 | Lyons | ............. | G11B 27/034 715/720 |
| 2011/0181520 A1* | 7/2011 | Boda et al. | ............. | 345/173 |
| 2012/0182445 A1 | 7/2012 | You et al. | | |
| 2012/0287315 A1* | 11/2012 | Huang et al. | ............. | 348/262 |
| 2012/0321280 A1* | 12/2012 | Lin | ............. | G11B 27/105 386/240 |
| 2013/0007663 A1* | 1/2013 | Piippo | ............. | G06F 3/0482 715/821 |

FOREIGN PATENT DOCUMENTS

| | | |
|---|---|---|
| JP | 2001-045409 A | 2/2001 |
| KR | 10-2012-0083085 A | 7/2012 |

OTHER PUBLICATIONS

Extended European Search Report issued for EP 12197193.1 (Aug. 14, 2014).

\* cited by examiner

DISPLAY APPARATUS AND METHOD

CROSS-REFERENCE TO RELATED PATENT APPLICATION

This application claims the benefit of Korean Patent Application No. 10-2011-0136562, filed on Dec. 16, 2011, in the Korean Intellectual Property Office, the entire disclosure of which is incorporated herein by reference.

BACKGROUND

Field of the Invention

The invention relates to a display apparatus and method where a moving picture and related still images are displayed together.

Description of the Related Art

A digital photographing apparatus may include a digital camera or a camcorder. Some digital photographing apparatuses display and capture both moving images and still images. In some cases the moving images and the still images are related to each other. For example, the still images may be captured while a moving image is being captured in a dual shooting or dual recording mode.

SUMMARY

Therefore, there is a need in the art for a display apparatus and method of controlling a display apparatus, the display apparatus including a display control unit for displaying a moving image on a first region of a display screen; and a thumbnail generation unit for generating a plurality of thumbnail images based on a plurality of still images related to the moving image, wherein the display control unit displays the plurality of thumbnail images on a second region of the display screen.

The plurality of still images may include still images obtained while capturing the moving image.

The plurality of thumbnail images may have the same size.

The display control unit may display the plurality of thumbnail images in a rightward or leftward direction in an order of generating the plurality of thumbnail images.

The plurality of thumbnail images may not have the same size.

The display control unit may display the plurality of thumbnail images in the same size if the number of thumbnail images is equal to or less than a first number, and may reduce the size of the plurality of thumbnail images if the number of thumbnail images is greater than the first number according to the size of the second region.

The moving image may be stopped on the first region of the display screen.

The display control unit may provide a focus window to one of the plurality of thumbnail images displayed on the second region so as to correspond to timings when the plurality of still images are captured.

A focus window may be provided to the second region, and each of the plurality of thumbnail images may be slid into the focus window at a timing when one of the plurality of still images corresponding to the thumbnail image is captured.

The focus window may have a size greater than the size of the plurality of thumbnail images.

The slid thumbnail image may be enlarged to the size of the focus window.

The focus window may move along the second region and may be fixed at a last thumbnail image, and thumbnail images next to the last thumbnail image may be slid into the fixed focus window.

The display control unit may display the plurality of thumbnail images in an overlapping manner.

The display control unit may overlap the plurality of thumbnail images in an order of capturing the plurality of still images, and may display a thumbnail image corresponding to a lastly captured still image.

The display control unit may maintain a certain number of overlapping thumbnail images.

The display control unit may overlap the plurality of thumbnail images in an order of capturing the plurality of still images in a direction in which the moving image is played.

The moving image may be being played.

If one of the plurality of thumbnail images displayed on the second region is selected, the display control unit may change a play position of the moving image to correspond to a timing when a still image corresponding to the selected thumbnail image is captured.

According to another aspect of the invention, there is provided a display apparatus including a display control unit for displaying a moving image on a first region of a display screen; and a thumbnail generation unit for generating a plurality of thumbnail images based on a plurality of still images related to the moving image, wherein the display control unit displays the plurality of thumbnail images on a second region of the display screen in an order of capturing the plurality of still images while the moving image is stopped.

According to another aspect of the invention, there is provided a display apparatus including a display control unit for displaying a moving image on a first region of a display screen; and a thumbnail generation unit for generating a plurality of thumbnail images based on a plurality of still images related to the moving image, wherein the display control unit displays the plurality of thumbnail images on a second region of the display screen in an order of capturing the plurality of still images while the moving image is being played; and provides a focus window to a thumbnail image corresponding to a play timing of the moving image.

According to another aspect of the invention, there is provided a display method including displaying a moving image on a first region of a display screen; generating a plurality of thumbnail images based on a plurality of still images related to the moving image; and displaying the plurality of thumbnail images on a second region of the display screen.

Displaying the plurality of thumbnail images may include displaying the plurality of thumbnail images on a second region of the display screen in an order of when the plurality of still images were captured and wherein each of the plurality of thumbnail images is displayed at a time during the displaying of the moving image when the still image corresponding to the thumbnail image was captured.

Displaying the plurality of thumbnail images may include displaying the plurality of thumbnail images in a smaller size if the plurality of thumbnail images cannot be displayed in the second region of the display screen in a current size.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
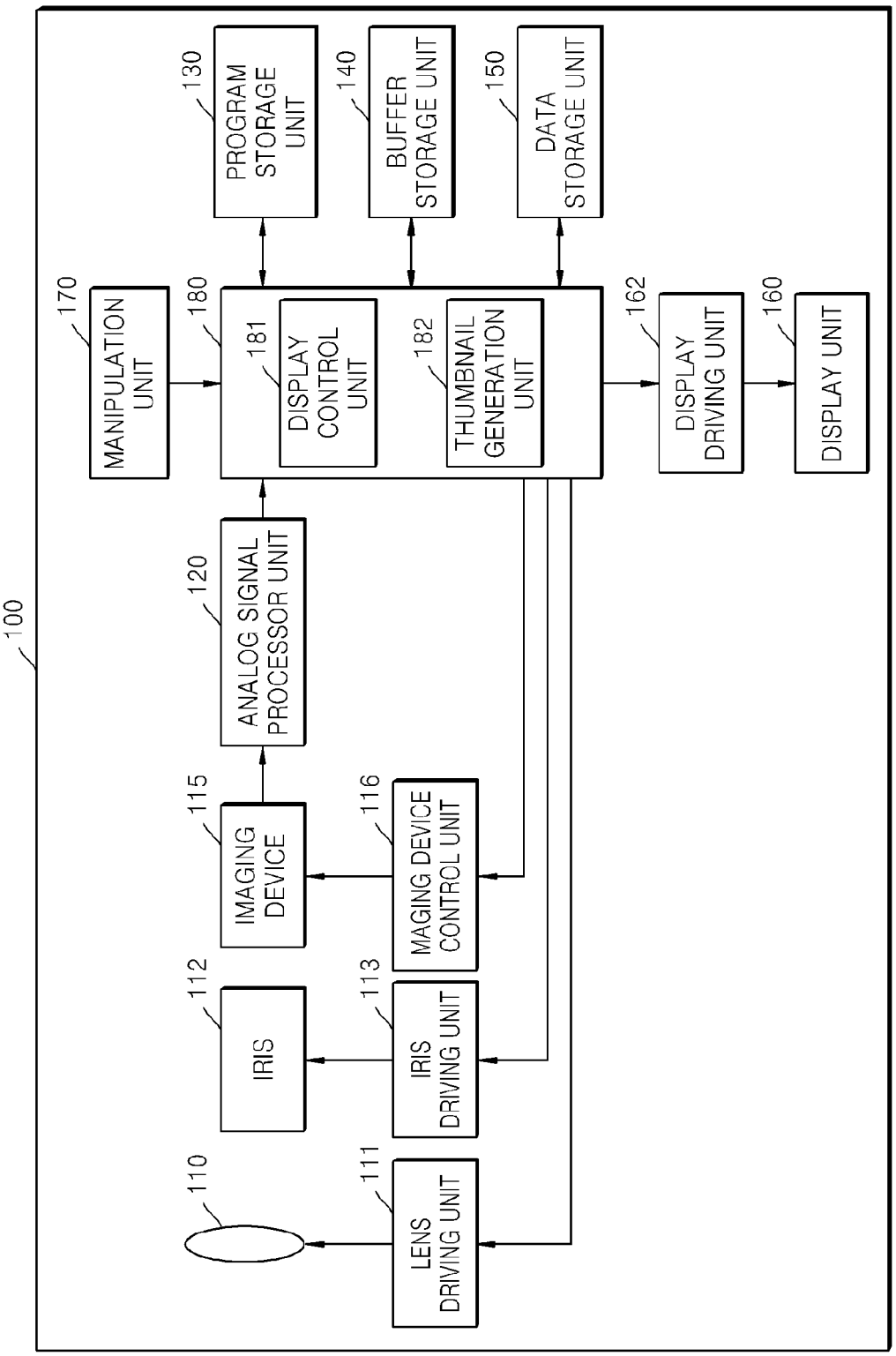
FIG. 1 is a block diagram of an embodiment of a digital camera as an example of a display apparatus according to an embodiment of the invention.

While exemplary embodiments of the invention are susceptible to various modifications and alternative forms, specific embodiments thereof are shown by way of example in the drawings and will herein be described in detail. It should be understood, however, that there is no intent to limit exemplary embodiments of the invention to the particular forms disclosed, but conversely, exemplary embodiments of the invention are to cover all modifications, equivalents, and alternatives falling within the spirit and scope of the invention. In the following description of the invention, a detailed description of known functions and configurations incorporated herein will be omitted when it may make the subject matter of the invention unclear.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting of exemplary embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, the invention will be described in detail by explaining embodiments of the invention with reference to the attached drawings. Like reference numerals in the drawings denote like elements and thus repeated descriptions will be omitted.

FIG. 1 is a block diagram of an embodiment of a digital camera 100 as an example of a display apparatus according to an embodiment of the invention.

Although the digital camera 100 is described, the display apparatus is not limited to the digital camera 100 and may also be applied to portable devices such as a camera phone, a personal digital assistant (PDA), a portable multimedia player (PMP), and a camcorder, and home appliances such as a television (TV) and a monitor capable of displaying all types of contents.

The digital camera 100 may include a lens unit 110, a lens driving unit 111, an iris 112, an iris driving unit 113, an imaging device 115, an imaging device control unit 116, an analog signal processing unit 120, a program storage unit 130, a buffer storage unit 140, a data storage unit 150, a display driving unit 162, a display unit 160, a digital signal processing unit 180, and a manipulation unit 170. Here, the lens unit 110, the lens driving unit 111, the iris 112, the iris driving unit 113, the imaging device 115, the imaging device control unit 116, and the analog signal processing unit 120 may be referred to as an imaging unit.

The lens unit 110 concentrates an optical signal. The lens unit 110 may include a zoom lens for controlling a viewing angle to be reduced or increased according to a focal length, and a focus lens for focusing on a subject. Each of the zoom lens and the focus lens may include a single lens or a group of lenses. The iris 112 is open or closed to adjust the intensity of incident light.

The lens driving unit 111 and the iris driving unit 113 receive control signals from the digital signal processing unit 180 and respectively drive the lens unit 110 and the iris 112. The lens driving unit 111 adjusts the focal length and performs auto focusing, zooming, and focus changing operations by adjusting the position of the lens unit 110. The iris driving unit 113 performs auto focusing, automatic exposure correction, focus changing, and subject depth adjusting operations by opening or closing the iris 112, and more particularly, by adjusting an f number or an aperture value of the iris 112.

An optical signal transmitted through the lens unit 110 forms an image of a subject on a light receiving surface of the imaging device 115. The imaging device 115 may be a charge coupled device (CCD), a complementary metal oxide semiconductor image sensor (CIS), or a high-speed image sensor for converting an optical signal into an electrical signal. The imaging device 115, for example, the sensitivity of the imaging device 115, may be controlled by the imaging device control unit 116. The imaging device control unit 116 may control the imaging device 115 according to a control signal that is automatically generated in response to a real-time input image signal or a control signal that is manually input by a user's manipulation. An exposure time of the imaging device 115 is adjusted by a shutter (not shown). The shutter may be a mechanical shutter for adjusting incidence of light by moving a shutter, or an electronic shutter for controlling exposure by supplying an electrical signal to the imaging device 115.

The analog signal processing unit 120 performs noise reduction, gain adjusting, waveform shaping, and analog-digital conversion on an analog signal supplied from the imaging device 115.

The manipulation unit 170 is used to input a control signal from outside the digital camera 100, e.g., from a user. The manipulation unit 170 may include various functional buttons such as a shutter-release button for inputting a shutter-release signal for capturing an image by exposing the imaging device 115 to light for a set period of time, a power button for inputting a control signal for controlling power on or off, wide-zoom and tele-zoom buttons for increasing or reducing a viewing angle according to an input, buttons for inputting text, a mode selection button for selecting a shooting mode or a display mode, a button for setting a white balance value, and a button for setting an exposure value. The manipulation unit 170 is not limited to the buttons and may be any element for allowing a user to input signals, e.g., a keyboard, a touch pad, a touch screen, or a remote controller. According to an embodiment of the invention, a user inputs a data display signal by using a touch pad or a touch screen included in the display unit 160.

The digital camera 100 displays a moving image and still images or thumbnail images generated from the still images on two regions of the display unit 160. For example, the display unit 160 may be divided into a main region and an auxiliary region, a moving image may be displayed on the main region, and still images obtained while capturing the moving image or thumbnail images obtained by reducing the still images may be displayed on the auxiliary region.

The digital camera 100 includes the program storage unit 130 for storing programs such as an operating system for driving the digital camera 100, and an application system, the buffer storage unit 140 for temporarily storing data required for and resulted from calculation, and the data storage unit 150 for storing image files including image signals and various types of information required to execute the programs.

The digital camera 100 includes the display unit 160 for displaying an operation state of the digital camera 100, or still or moving images captured by the digital camera 100. The display unit 160 may provide visual and auditory information to a user. In order to provide visual information, the display unit 160 may be formed as, for example, a liquid crystal display (LCD) panel or an organic light emitting display (OLED) panel. The display driving unit 162 provides a driving signal to the display unit 160.

The digital camera 100 includes the digital signal processing unit 180 for processing an input image signal and controlling the other elements according to the processed image signal or an external input signal. The digital signal processing unit 180 may perform image processing such as noise reduction, gamma correction, color filter array interpolation, color matrix, color correction, and color enhancement on the image signal to improve image quality. Also, image data generated by performing image processing may be compressed to generate an image file, or the image data may be restored from the image file. The image data may be compressed reversibly or irreversibly. The compressed image data may be stored in the data storage unit 150. Also, the digital signal processing unit 180 may functionally perform coloring, blurring, edge enhancement, image analysis, image recognition, and image effecting. Image recognition may include face recognition or scene recognition. For example, luminance level adjustment, color correction, contrast adjustment, edge enhancement, screen splitting, character image generation, and image synthesis may be performed.

Also, the digital signal processing unit 180 may generate and provide control signals for controlling auto focusing, zoom changing, focus changing, and automatic exposure to the lens driving unit 111, the iris driving unit 113, and the imaging device control unit 116 by executing a program stored in the program storage unit 130 or by using an additional module, and may control overall operations of the other elements of the digital camera 100, e.g., a shutter and a flash.

The digital signal processing unit 180 displays a captured moving image on a first region of the display unit 160. While displaying the moving image, a plurality of thumbnail images generated based on a plurality of still images related to the moving image on a second region of the display unit 160. Here, the still and moving images are related to each other and may be captured by performing continuous shooting, pre-recording, or dual shooting. For example, five still images may be captured while capturing a moving image for one minute. A first region may be the main region of the display unit 160 and a second region may be the auxiliary region of the display unit 160. The digital signal processing unit 180 may be considered a display apparatus.

The digital signal processing unit 180 includes a display control unit 181 and a thumbnail generation unit 182. The display control unit 181 displays a moving image on a first region of a display screen and displays thumbnail images corresponding to still images related to the moving image, e.g., still images captured while capturing the moving image, on a second region of the display screen.

The thumbnail generation unit 182 generates a plurality of thumbnail images based on a plurality of still images related to a moving image.

If a user selects via the manipulation unit 170 a mode for simultaneously displaying dual-captured files, for example, moving and still images, the digital signal processing unit 180 displays the dual-captured files. The digital signal processing unit 180 displays thumbnail images of the still images while the dual-captured moving image is stopped or being played. According to an embodiment of the invention, the thumbnail images corresponding to the still images are displayed while the moving image is stopped or being played. In this case, if the number of thumbnail images is greater than a certain number, the thumbnail images may be displayed in different rows or may be reduced in size to be displayed in one row. Alternatively, the thumbnail images corresponding to the still images are displayed while the moving image is being played. While the moving image is stopped or being played thumbnail images may be displayed at the time when the still images are captured, and the thumbnail images corresponding to previous and current still images may be displayed in an overlapping manner. Accordingly, moving and still images may be simultaneously provided on one screen and, when the number of captured still images is increased, a user may check a total number of still images and may simultaneously view or compare the captured still images on one screen. Also, while the moving image is being played, the user may simultaneously check a timing when each still image is captured and a total number of still images.

FIGS. 2 through 10 are images for describing display operations according to embodiments of the invention.

Figure 2A:
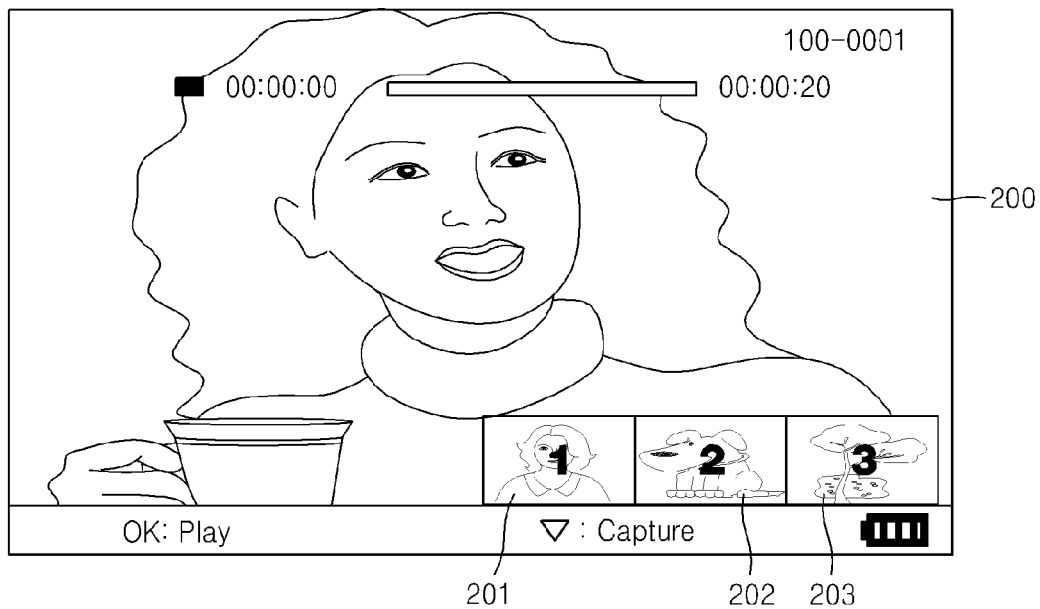
FIGS. 2 through 10 are images for describing example display operations according to embodiments of the invention.
Figure 2B:
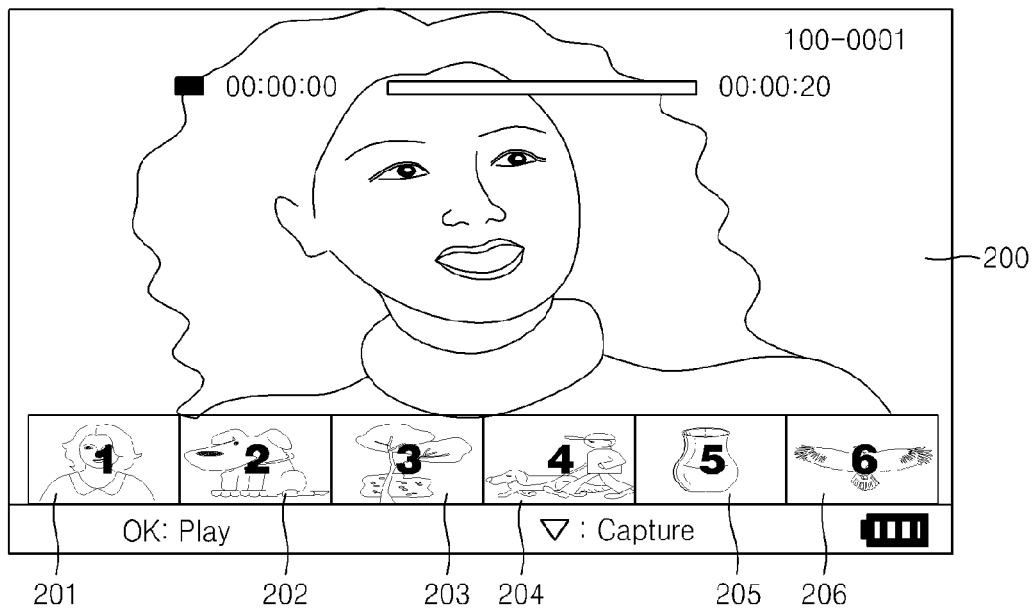
Figure 2C:
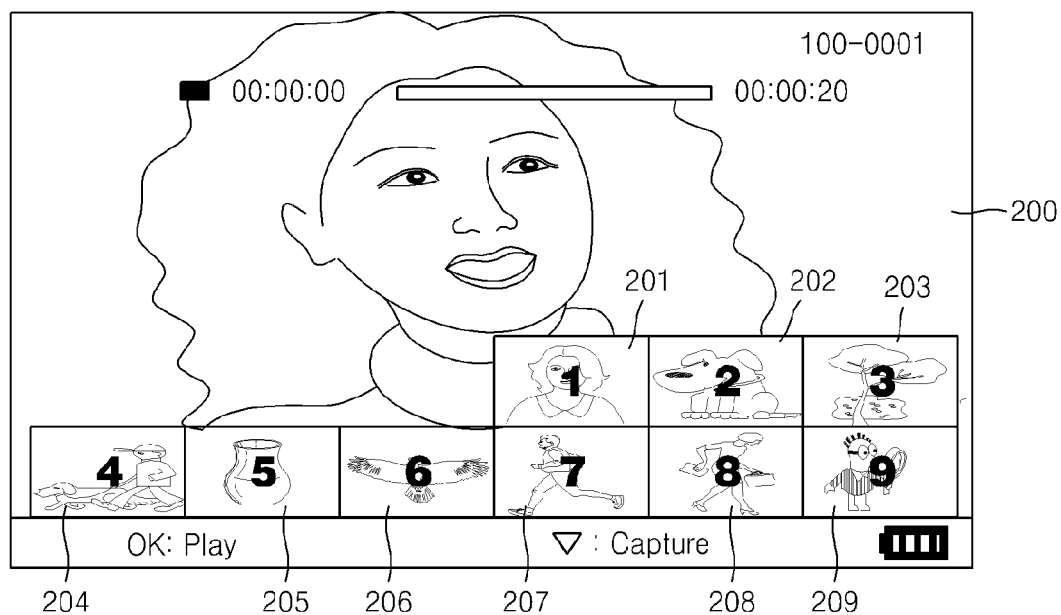

FIGS. 2A through 2C illustrate a stopped moving image 200 displayed on a first region of a display screen, and thumbnail images of the same size as each other displayed on a second region of the display screen.

Referring to FIG. 2A, the moving image 200 is displayed on the first region and thumbnail images 201 through 203 are displayed on the second region. The thumbnail images 201 through 203 are obtained by reducing still images related to the moving image 200, e.g., still images captured while capturing the moving image 200. Also, the number of the thumbnail images 201 through 203, i.e., three, is the number of the related still images. The thumbnail images 201 through 203 are displayed in an order of capturing the still images. As illustrated in FIG. 2A, the thumbnail image 201 of a first captured still image, the thumbnail image 202 of a second captured still image, and the thumbnail image 203 of a third captured still image are sequentially displayed in a rightward direction. However, alternatively, the thumbnail images 201 through 203 may be sequentially displayed in a leftward direction.

Referring to FIG. 2B, the moving image 200 is displayed on the first region and thumbnail images 201 through 206 are displayed on the second region. Here, a total number of thumbnail images is six. Referring to FIG. 2C, if a total number of thumbnail images is nine and thus the thumbnail images may not be displayed in one row on a screen, six thumbnail images, e.g., the thumbnail images 204 through 209, are displayed in a first row of the second region and three thumbnail images, e.g., the thumbnail images 201 through 203, are displayed in a second row of the second region. Here, the thumbnail images 201 through 209 are displayed at timings when the still images are captured or in an order of capturing still images.

Figure 3A:
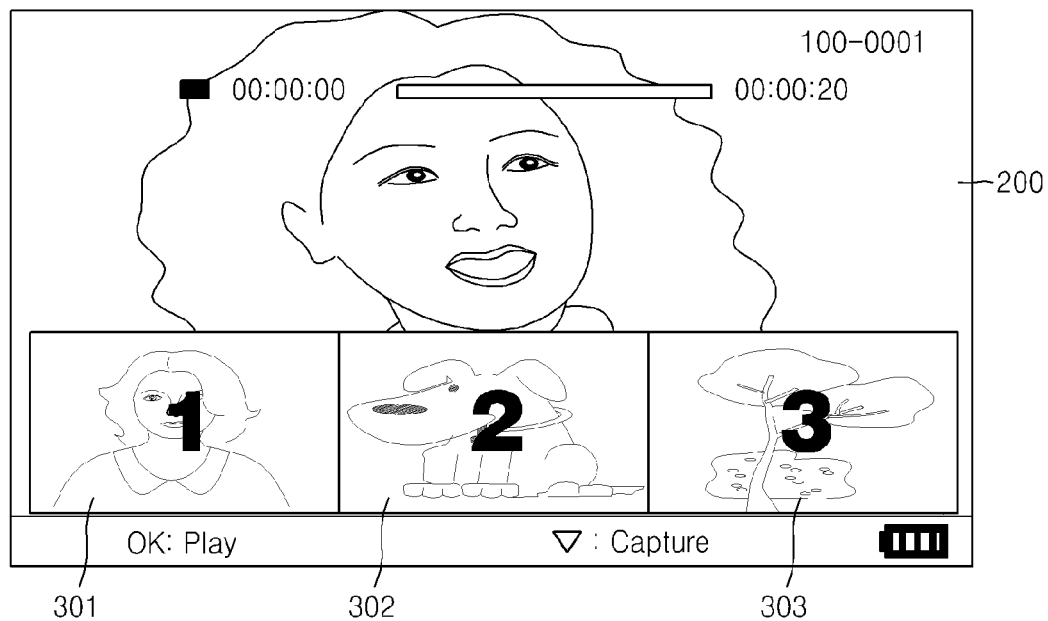
Figure 3B:
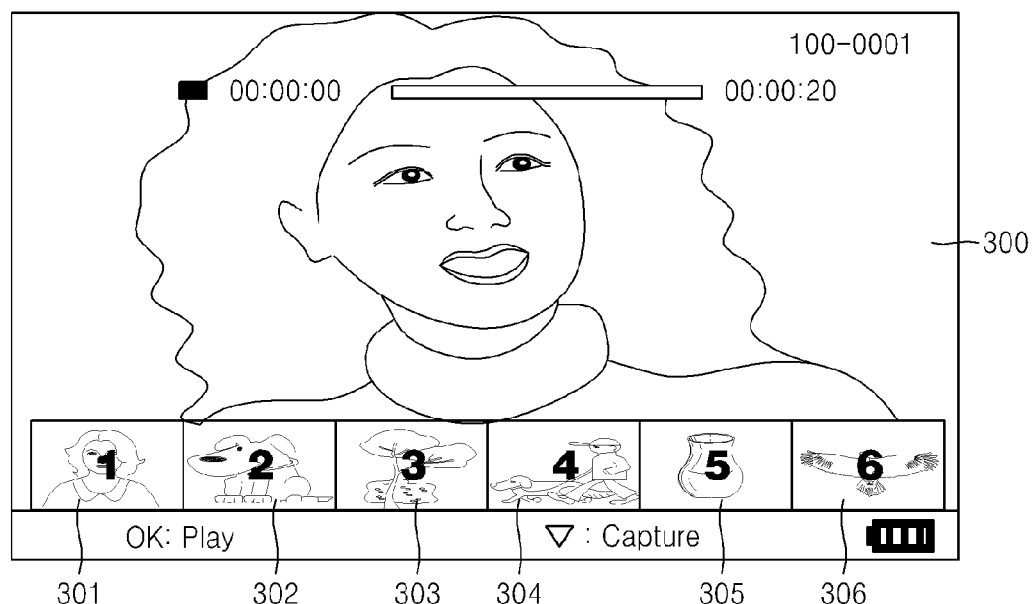
Figure 3C:
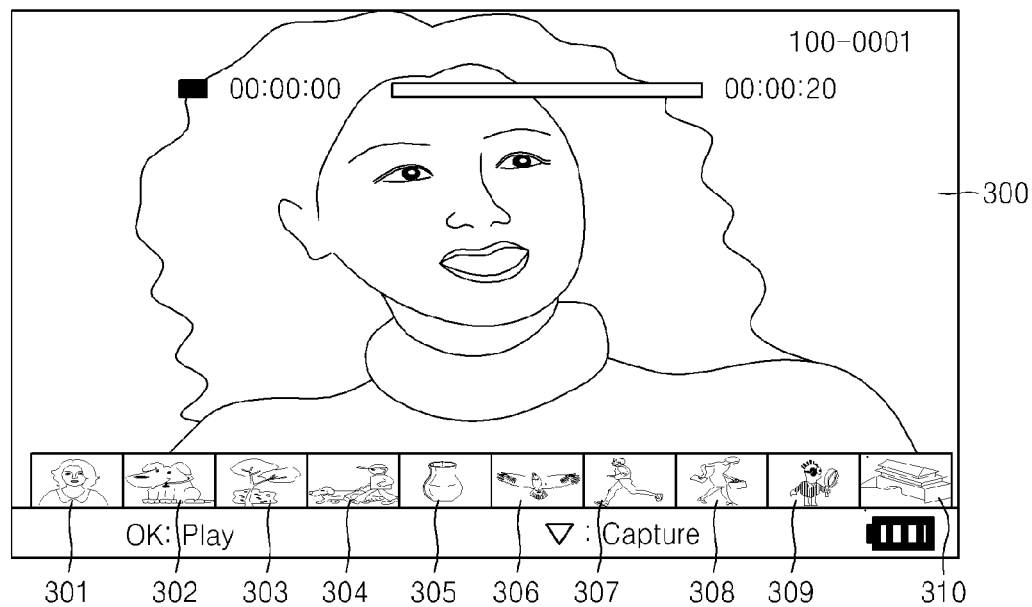

FIGS. 3A through 3C illustrate an example of a stopped moving image 200 displayed on the first region, and illustrate thumbnail images displayed on the second region with various sizes.

Referring to FIG. 3A, three thumbnail images, e.g., thumbnail images 301 through 303, are displayed with the same size. Referring to FIG. 3B, if six thumbnail images, e.g., thumbnail images 301 through 306, are displayed, the size of the thumbnail images 301 through 306 is reduced according to the size, e.g., a length, of the second region. Referring to FIG. 3C, if ten thumbnail images, e.g., thumbnail images 301 through 310 are displayed, the size of the thumbnail images 301 through 310 is further reduced to be less than the size of the thumbnail images 301 through 306 illustrated in FIG. 3B in order to fit the thumbnail images 301 through 310 on the second region of the display.

In FIGS. 2A through 2C and 3A through 3C, while a moving image is stopped, if a user touches or selects a displayed thumbnail image, a play position of the moving image may be changed to correspond to a timing when a still image corresponding to the selected thumbnail image is captured. Thus, the moving image displayed on the first region is changed accordingly.

FIGS. 4 through 10 illustrate an example of thumbnail images being displayed while a moving image is being played, and FIGS. 4 through 7 illustrate an example of a case when a focus window is provided to one of thumbnail images displayed on the second region.

Figure 4A:
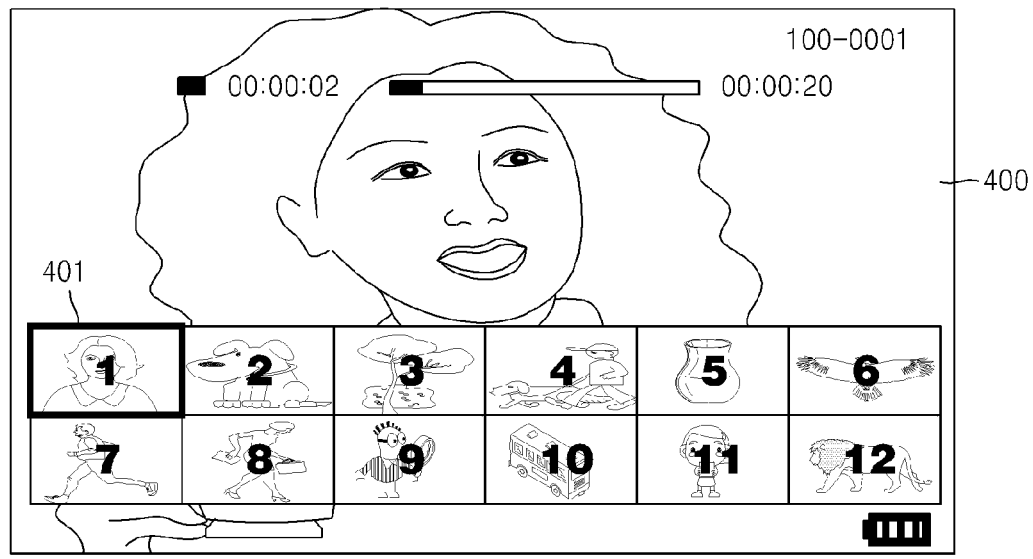
Figure 4B:
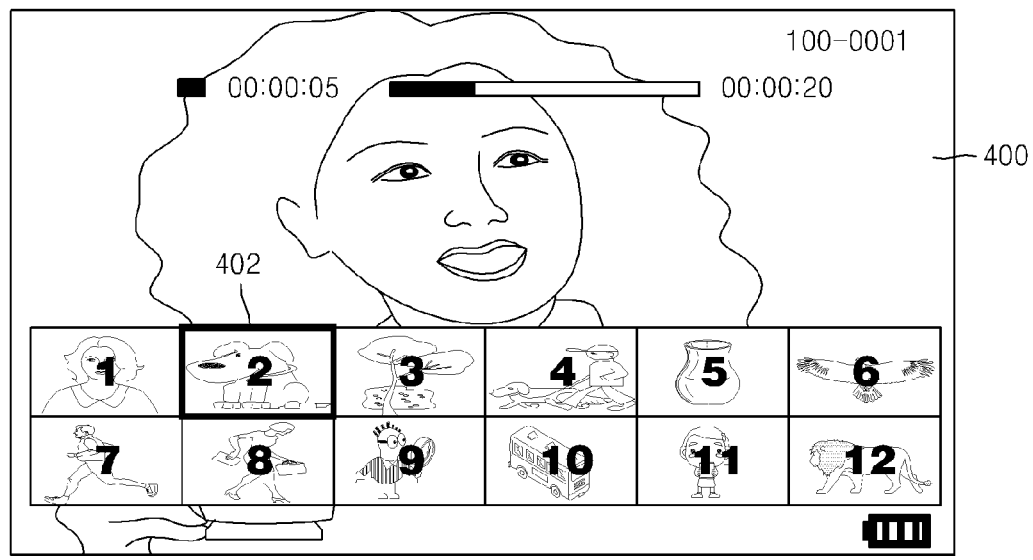
Figure 4C:
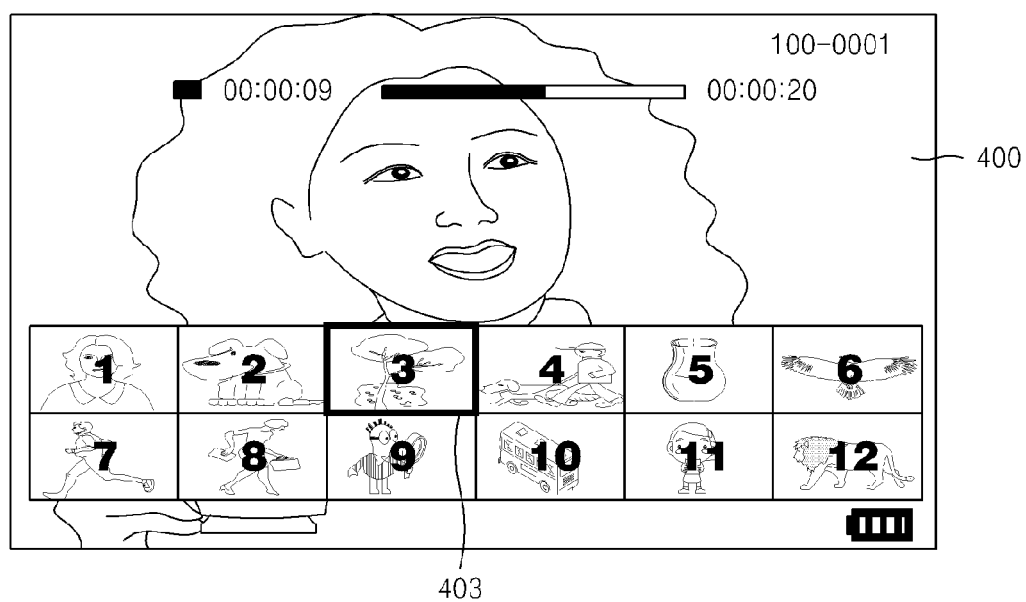

Referring to FIGS. 4A through 4C, a moving image 400 is being played on the first region and a plurality of thumbnail images are displayed on the second region. Initially, as illustrated in FIG. 4A, a thumbnail image corresponding to a still image captured at a current timing of the moving image, e.g., 2 seconds out of 20 seconds that is a total play time of the moving image 400, is a first thumbnail image and a focus window 401 is provided to the first thumbnail image. Then, as illustrated in FIG. 4B, a thumbnail image corresponding to a still image captured at 5 seconds is a second thumbnail image and a focus window 402 is provided to the second thumbnail image. As illustrated in FIG. 4C, a thumbnail image corresponding to a still image captured at 9 seconds is a third thumbnail image and a focus window 403 is provided to the third thumbnail image. Here, although each focus window disappears after being provided in FIGS. 4A through 4C, the focus window may also be continuously provided.

Figure 5A:
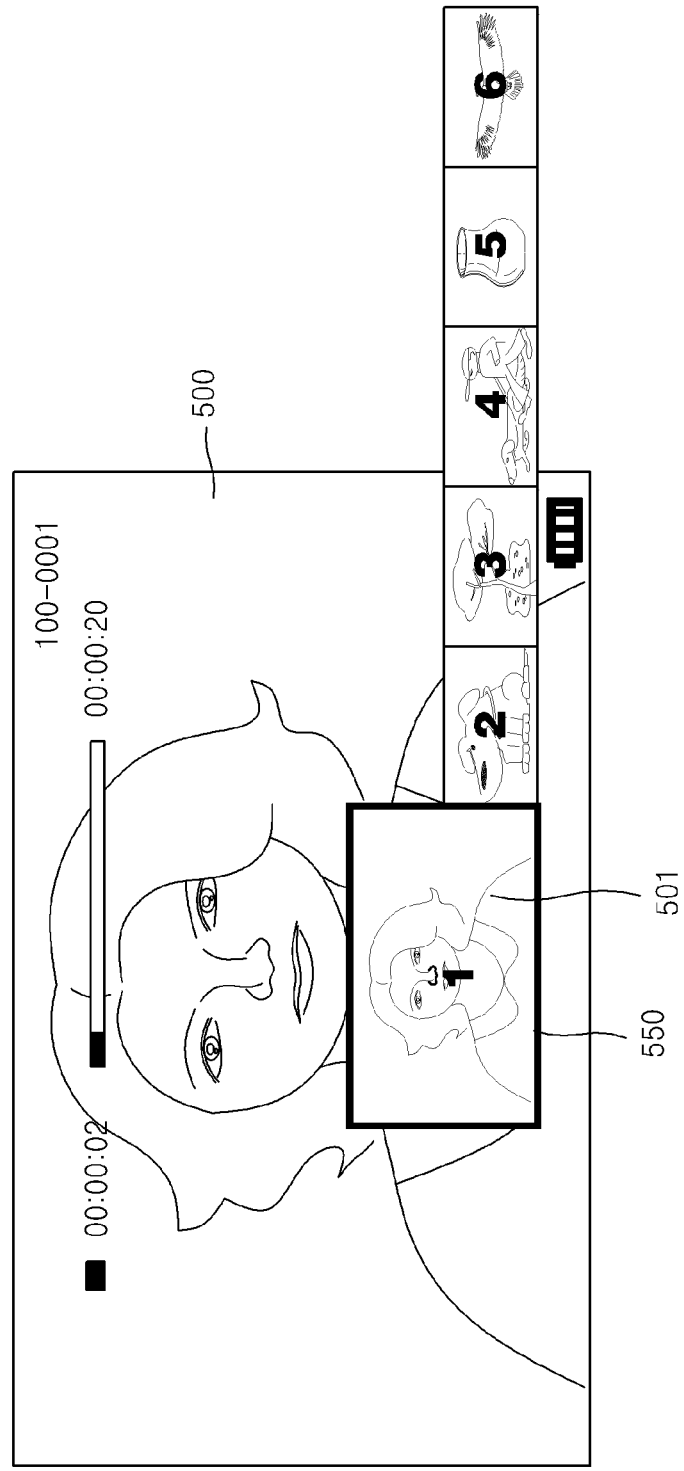
Figure 5B:
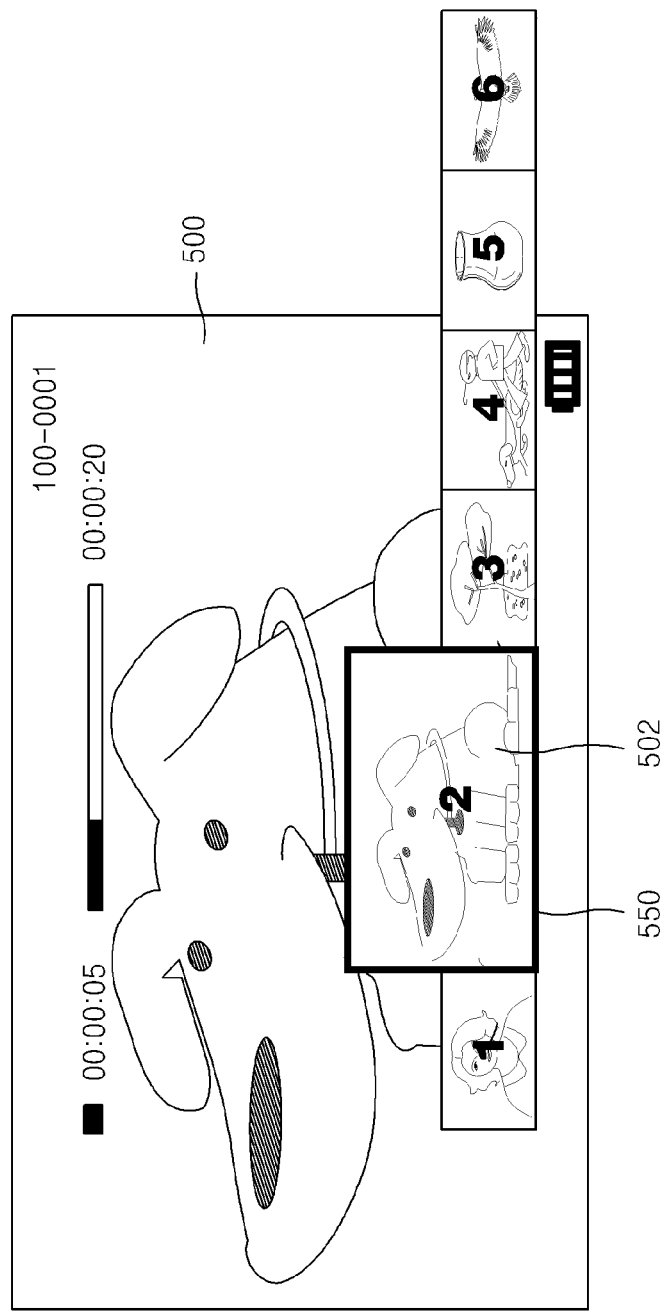
Figure 5C:
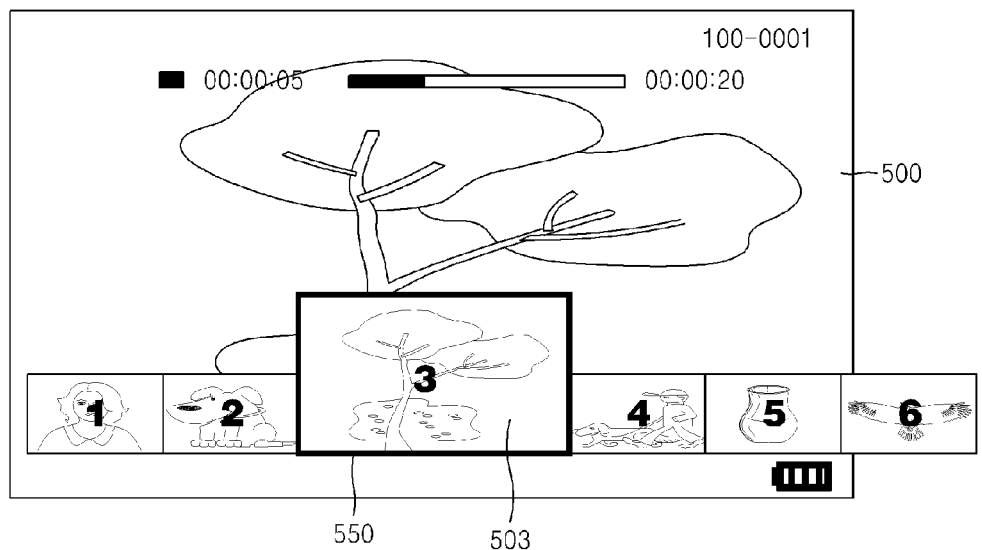

Referring to FIGS. 5A through 5C, a moving image 500 is being played on the first region and a plurality of thumbnail images are displayed on the second region. Although all thumbnail images are simultaneously displayed on the second region in FIGS. 4A through 4C, in FIGS. 5A through 5C, the thumbnail images are displayed in the form of slides and thus only a certain number of thumbnail images are simultaneously displayed.

As illustrated in FIG. 5A, a focus window 550 is fixed at the center of the second region and a first thumbnail image is slid into the focus window 550 at 2 seconds while the moving image 500 is being played. As illustrated in FIG. 5B, a second thumbnail image is slid into the focus window 550 at 5 seconds. As illustrated in FIG. 5C, a third thumbnail image is slid into the focus window 550 at 9 seconds. Here, although a sliding direction is a leftward direction in FIGS. 5A through 5C, the sliding direction may also be a rightward direction. Also, the focus window 550 has a size greater than the size of the thumbnail images and thus a thumbnail image is slid into the focus window 550 is enlarged.

Figure 6A:
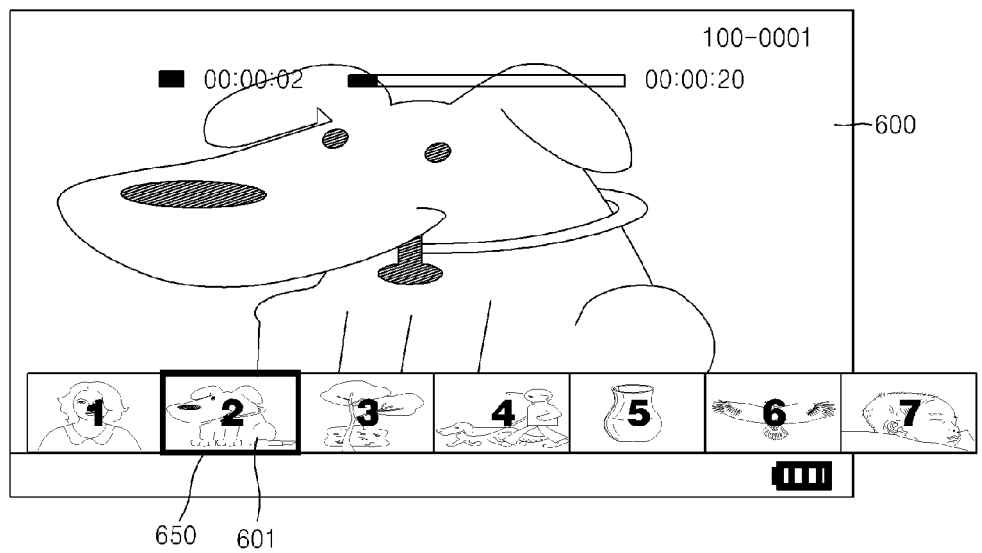
Figure 6B:
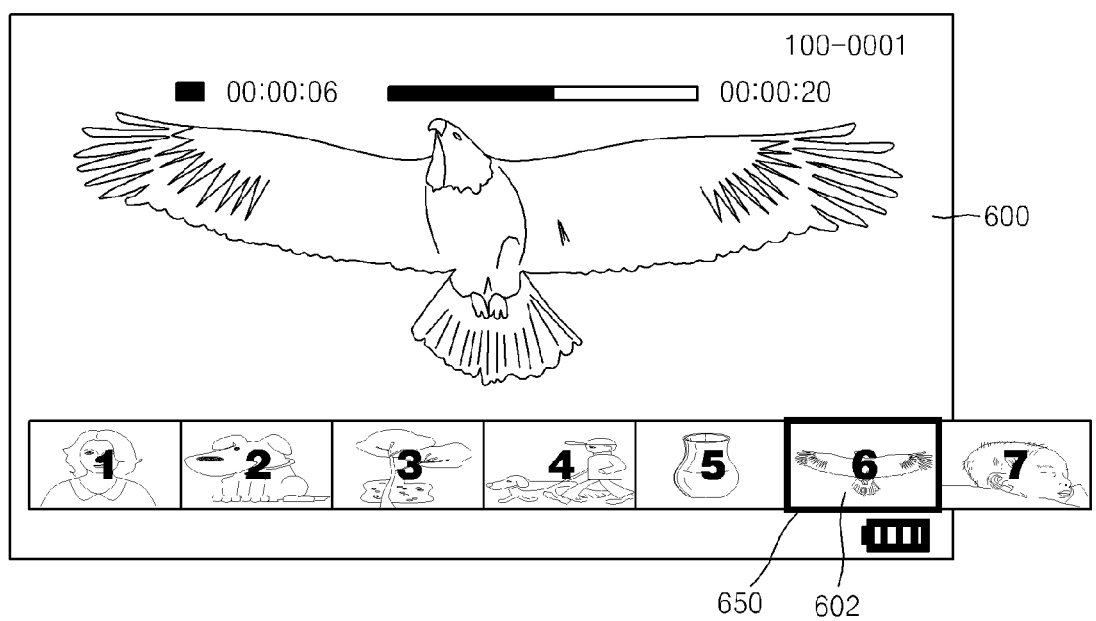
Figure 6C:
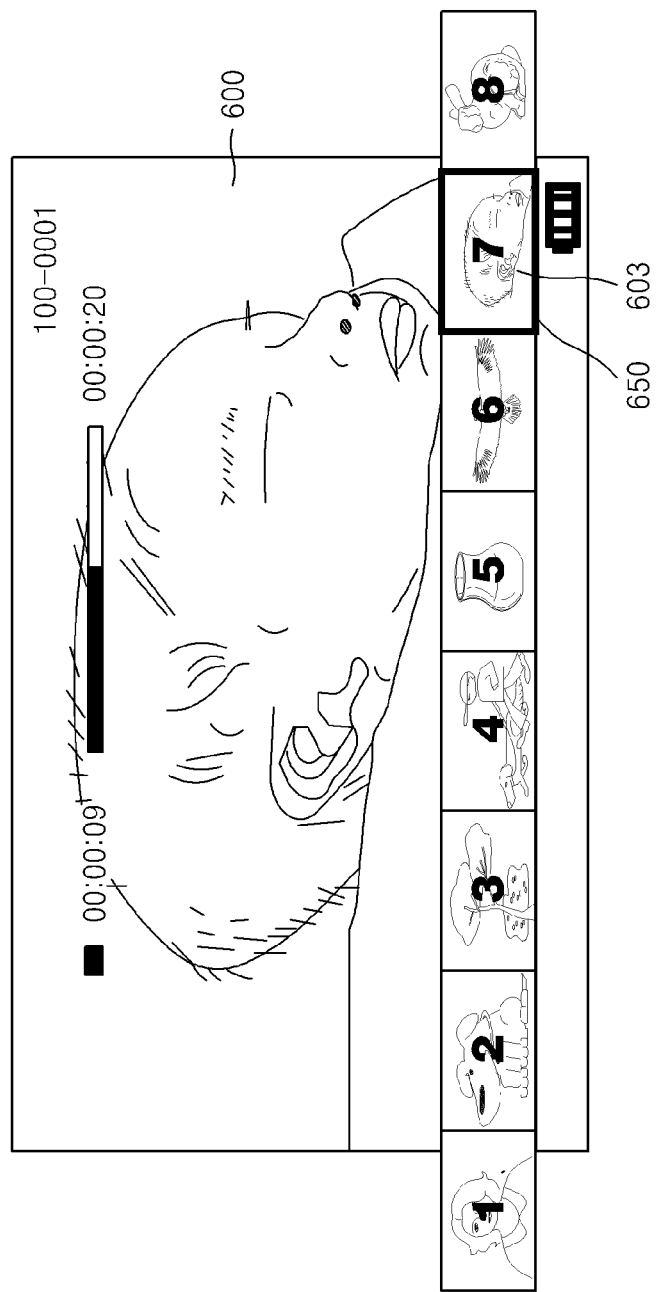

FIGS. 6A through 6C illustrate an example of a focus window 650 being fixed or moving. As illustrated in FIG. 6A, the focus window 650 is provided to a second thumbnail image 601 at 2 seconds. As illustrated in FIG. 6B, the focus window 650 is provided to a sixth thumbnail image 602 at 6 seconds. Then, as illustrated in FIG. 6C, the focus window 650 is fixed and a seventh thumbnail image 603 is slid into the focus window 650 at 9 seconds. That is, when a certain number of thumbnail images are simultaneously displayed, the focus window 650 is provided to each of the thumbnail images at a timing when a still image corresponding to the thumbnail image is captured. If the focus window 650 is provided to the last thumbnail image, e.g., the sixth thumbnail image 602 illustrated in FIG. 6B, from a next thumbnail image, e.g., the seventh thumbnail image 603 illustrated in FIG. 6C, each thumbnail image is slid into the focus window 650 in a leftward direction.

FIGS. 7 through 10 illustrate an example of thumbnail images being displayed on the second region not as a list or slides but rather as overlapping thumbnail image in a manner so as to lessen interruption to a moving image displayed on the first region.

FIGS. 7A through 7D illustrate an example of the number of displayed thumbnail images being fixed and where the thumbnail images are displayed on the second region in an overlapping manner in an order the still images corresponding to the thumbnail images were captured.

Figure 7A:
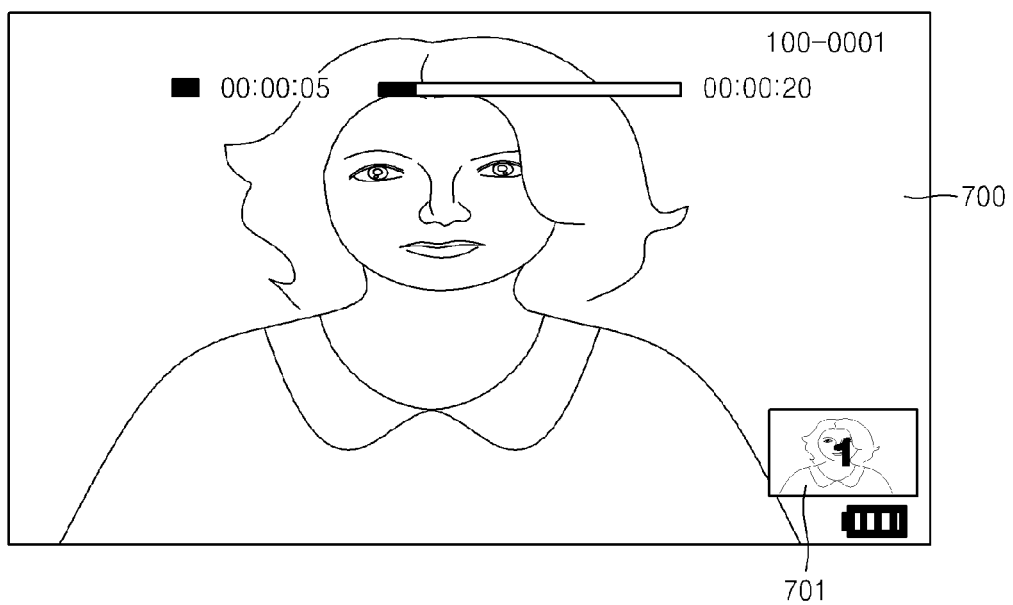
Figure 7B:
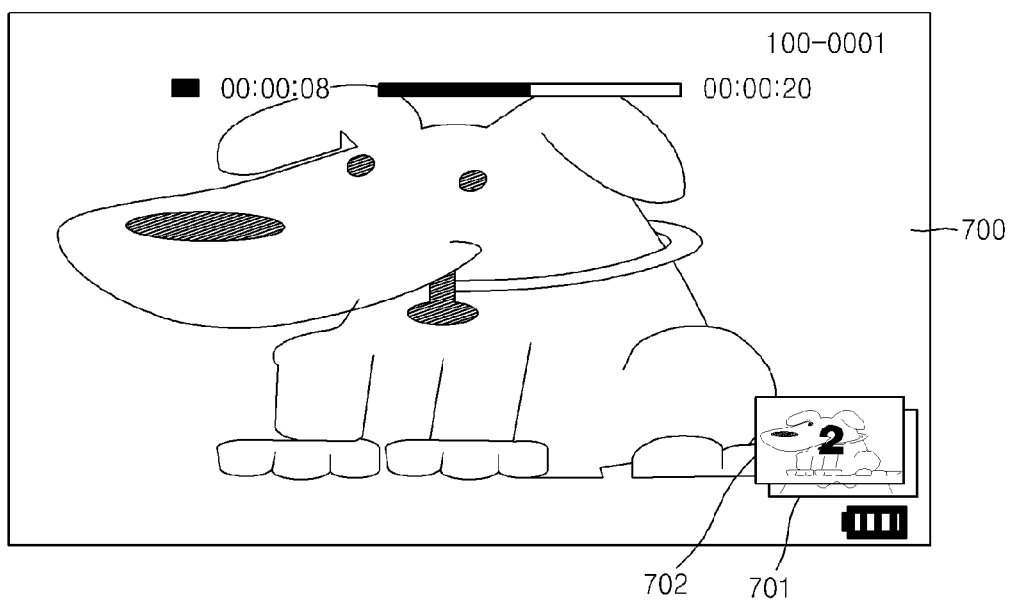
Figure 7C:
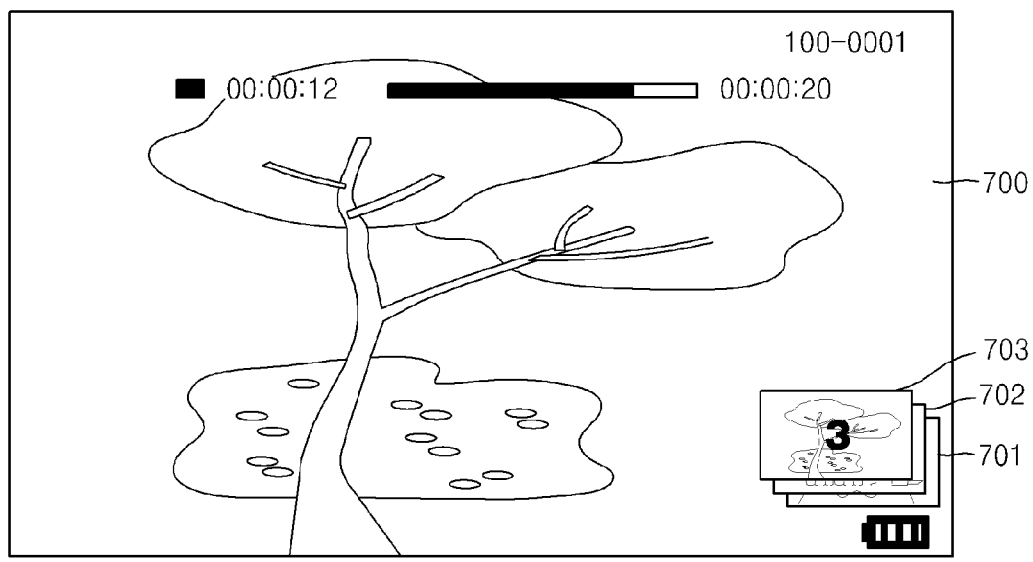
Figure 7D:
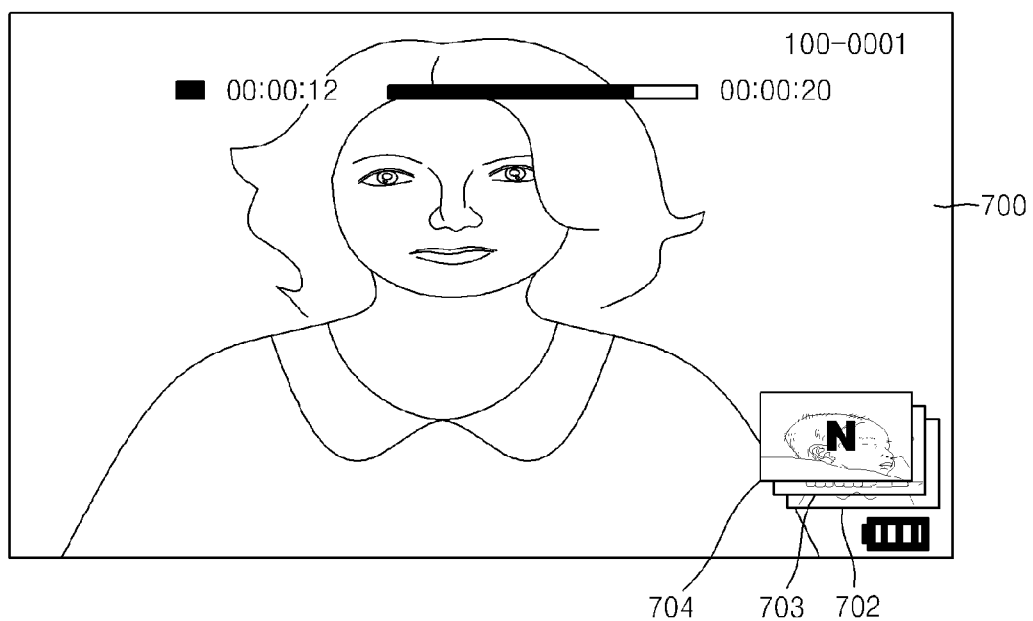

Referring to FIG. 7A, a moving image 700 is displayed on the first region and a thumbnail image 701 corresponding to a still image captured at 5 seconds is displayed on the second region. Referring to FIG. 7B, a thumbnail image 702 corresponding to a still image captured at 8 seconds overlaps onto the previously displayed thumbnail image 701. Referring to FIG. 7C, a thumbnail image 703 corresponding to a still image captured at 12 seconds overlaps onto the thumbnail images 701 and 702. Referring to FIG. 7D, a thumbnail image 704 corresponding to a still image captured lastly overlaps onto the thumbnail images 702 and 703. Here, only three thumbnail images are displayed in an overlapping manner and the thumbnail image 701 disappears so as to maintain only three thumbnail images. Accordingly, since thumbnail images corresponding to still images are displayed at timings when the still images are captured while a moving image is being played, the moving image is not interrupted.

FIGS. 8A through 8D show a case when the number of displayed thumbnail images is not limited and when the thumbnail images displayed on the second region overlap in a left upward direction in an order of capturing still images corresponding to the thumbnail images.

Figure 8A:
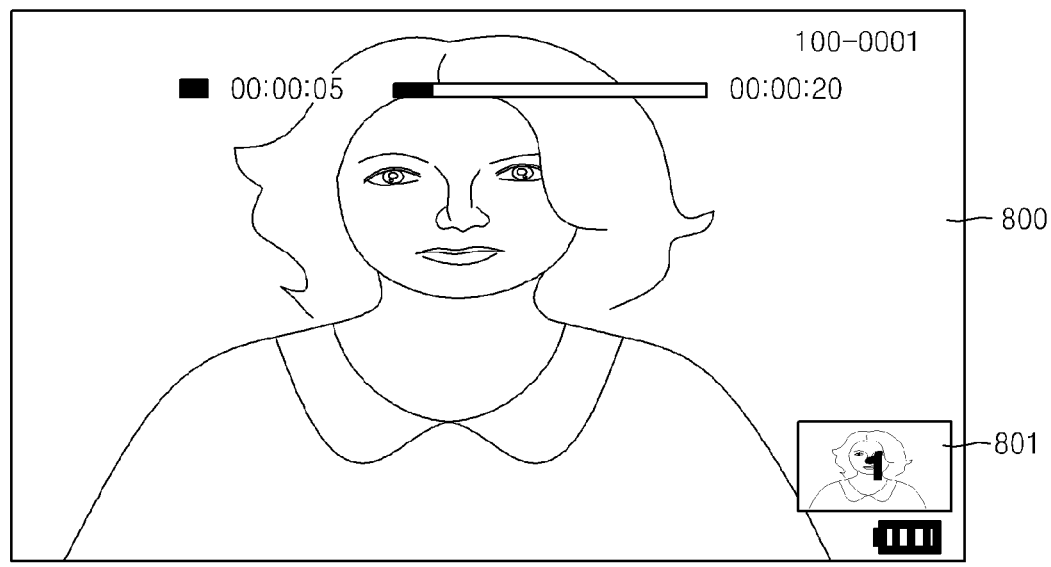
Figure 8B:
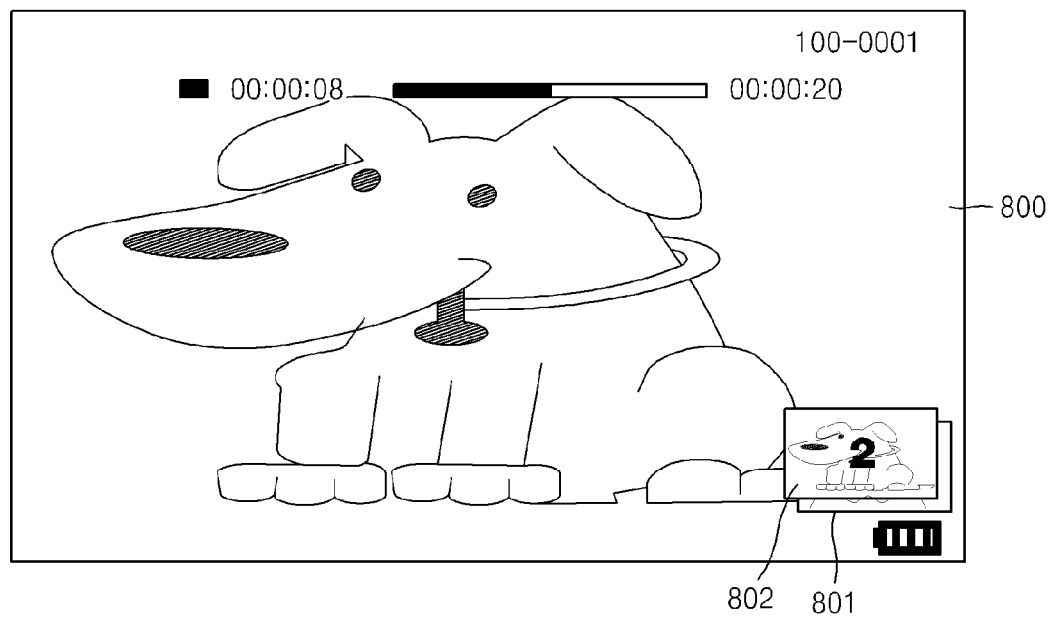
Figure 8C:
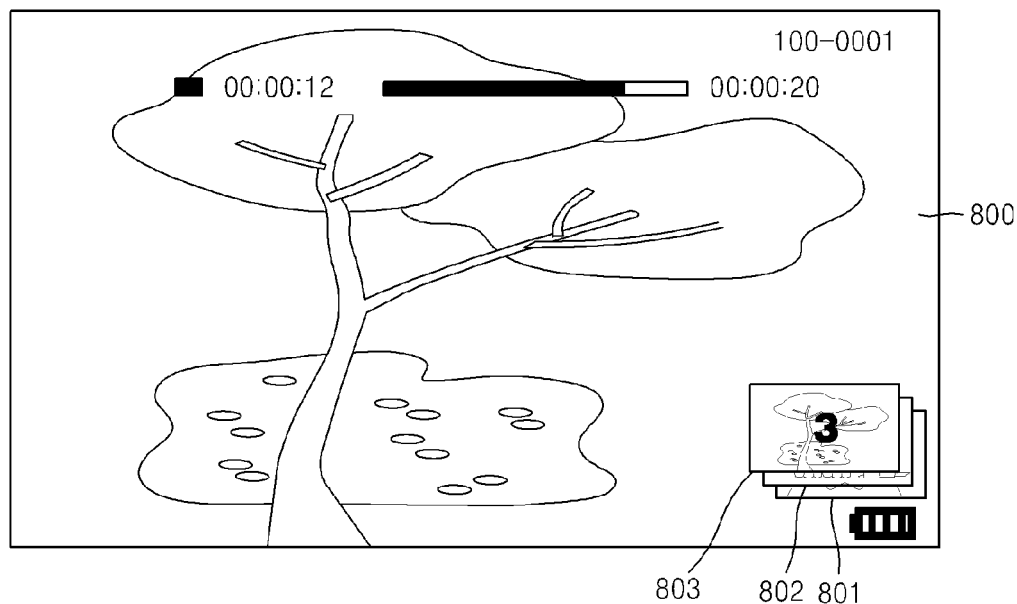
Figure 8D:
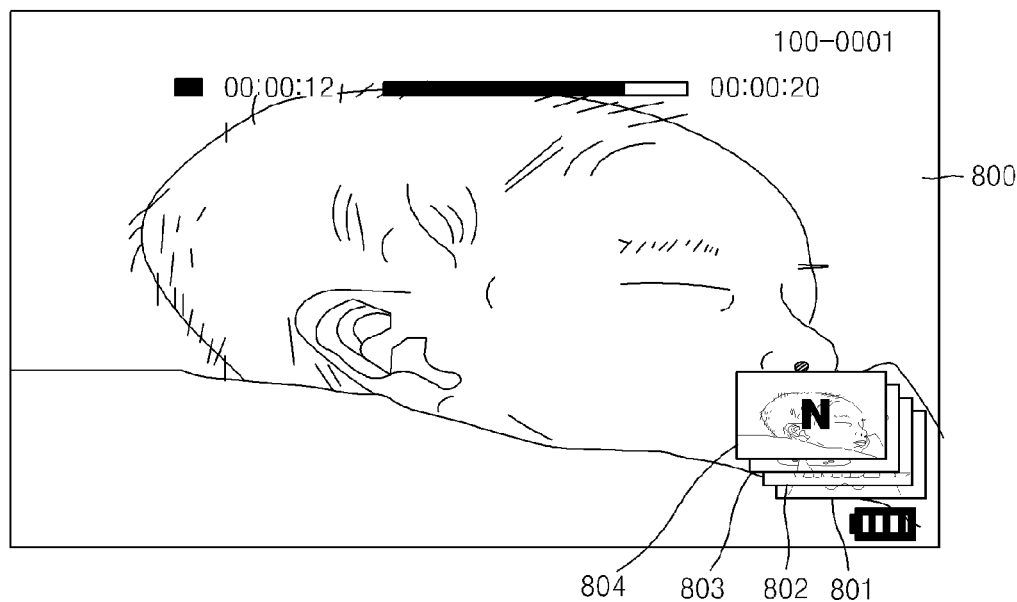
Figure 9A:
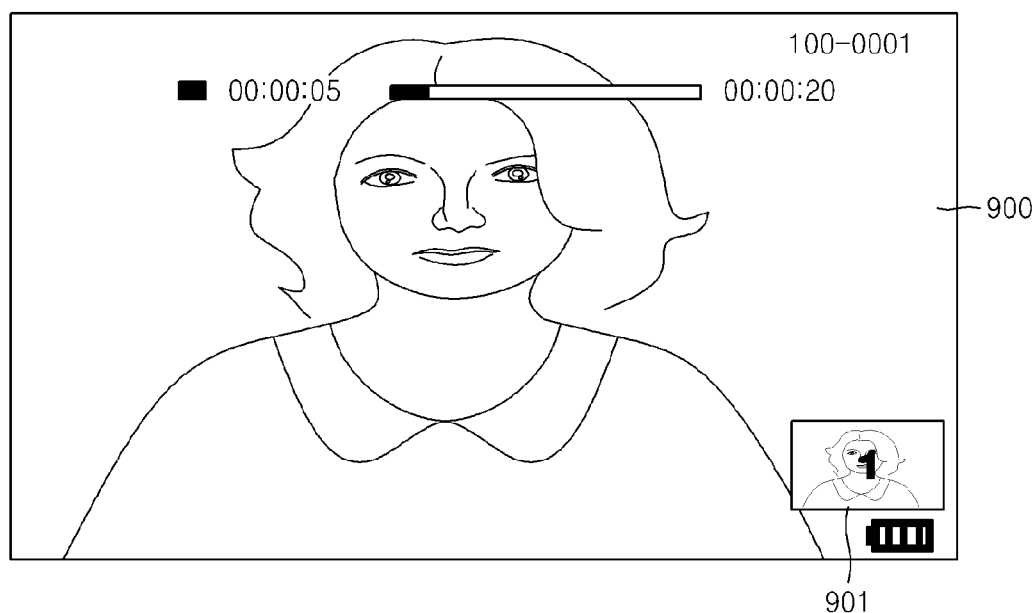
Figure 9B:
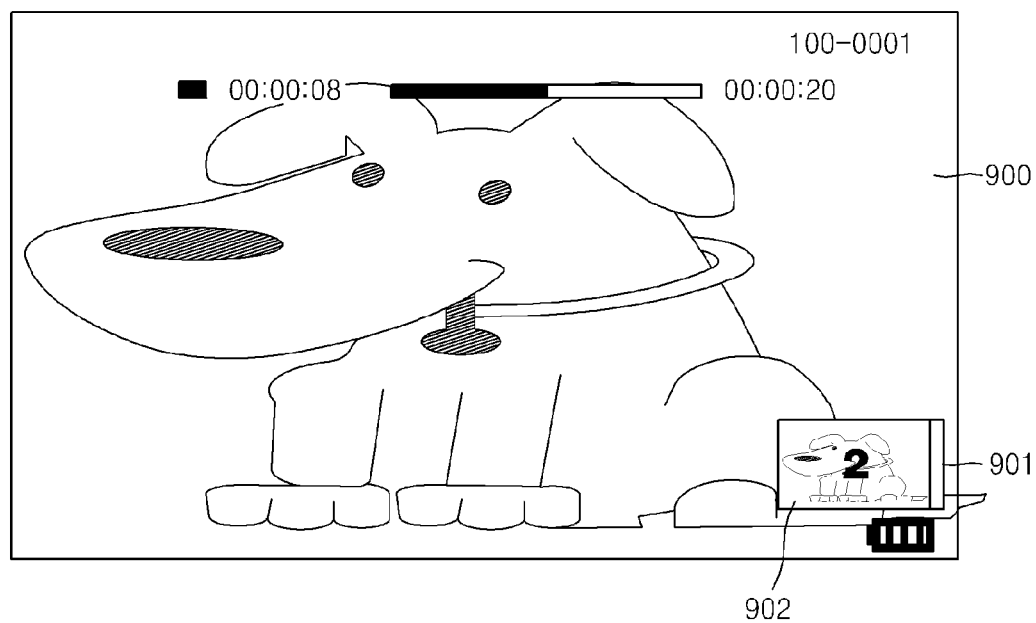
Figure 9C:
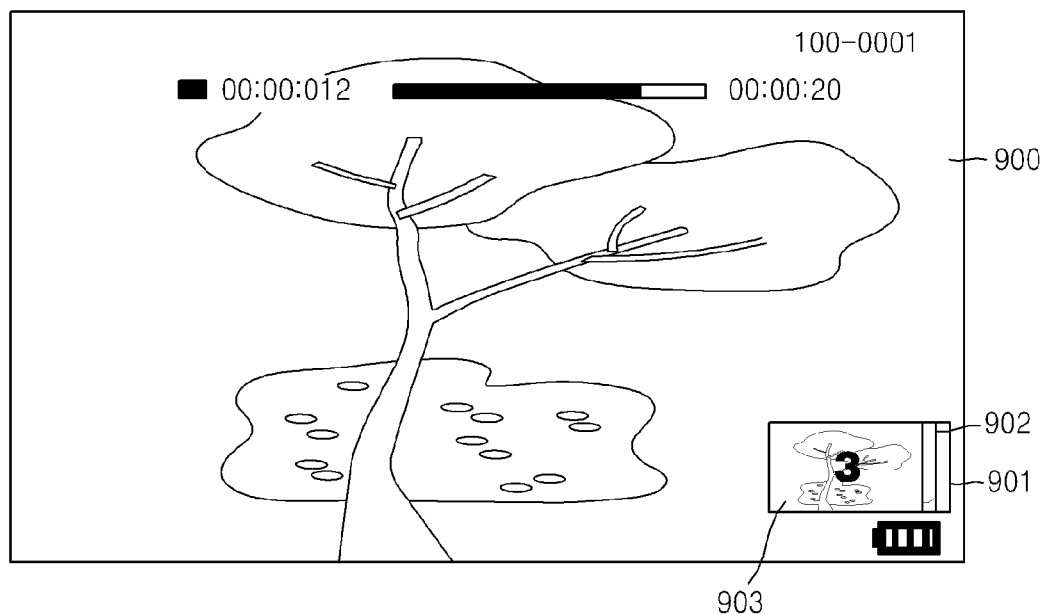
Figure 9D:
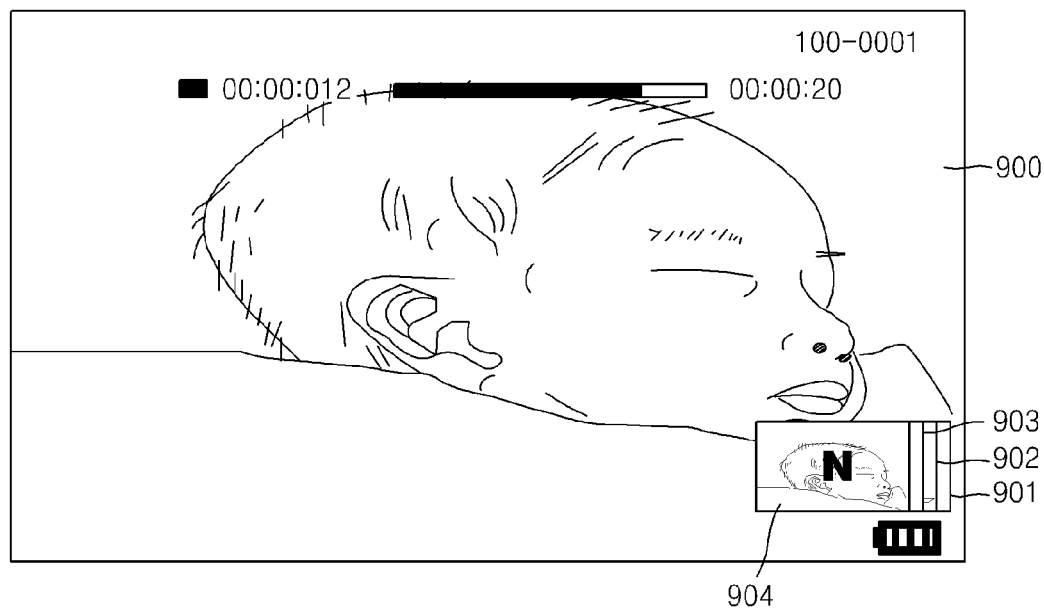
Figure 10A:
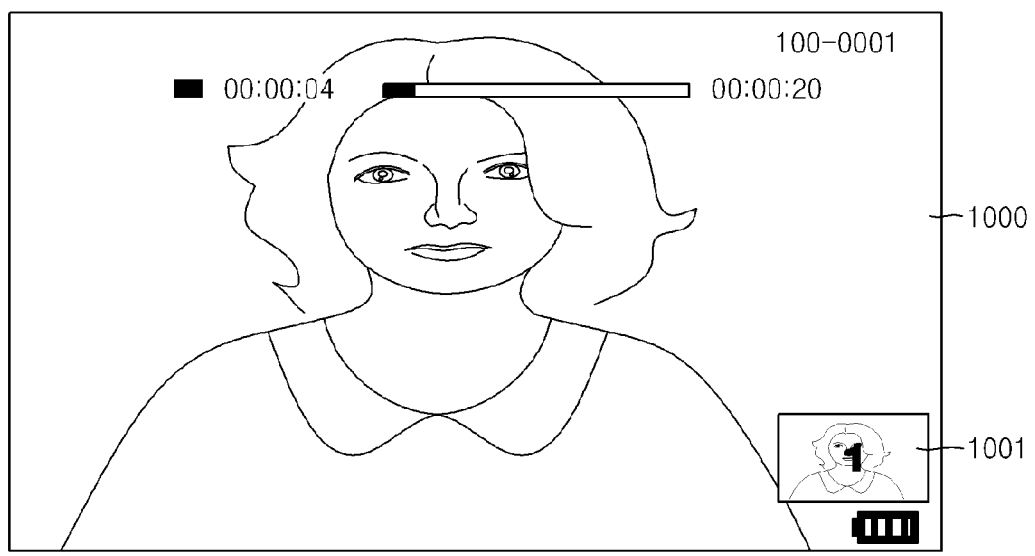
Figure 10B:
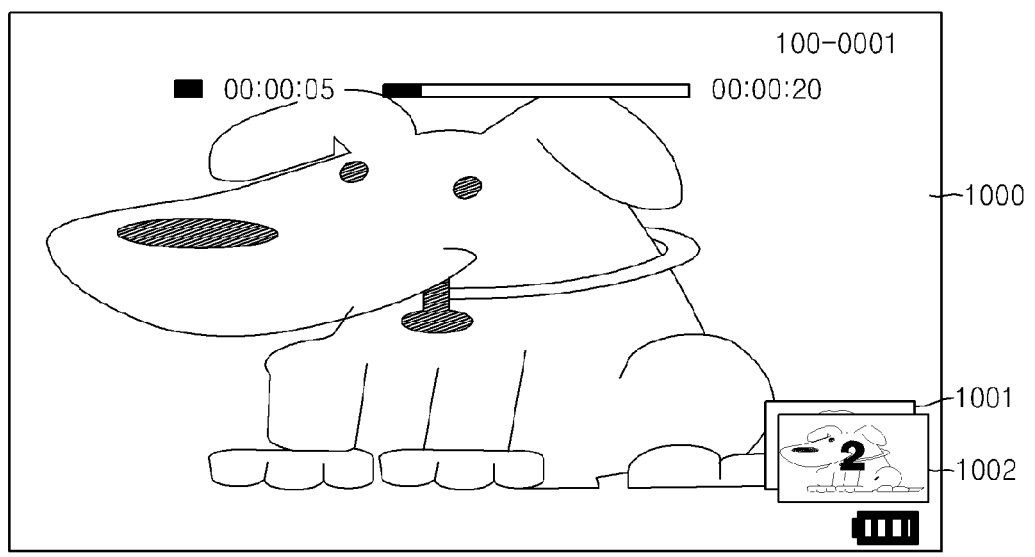
Figure 10C:
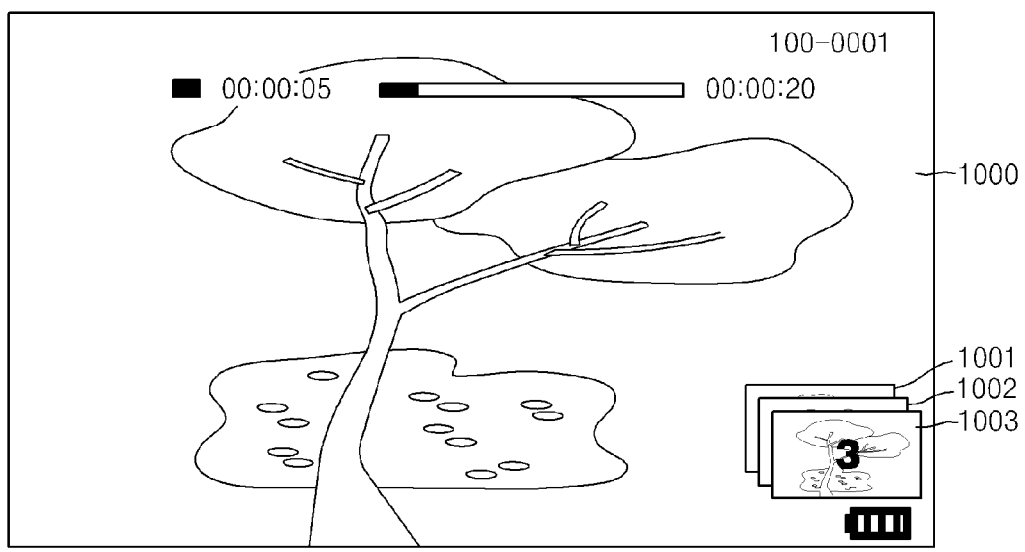
Figure 10D:
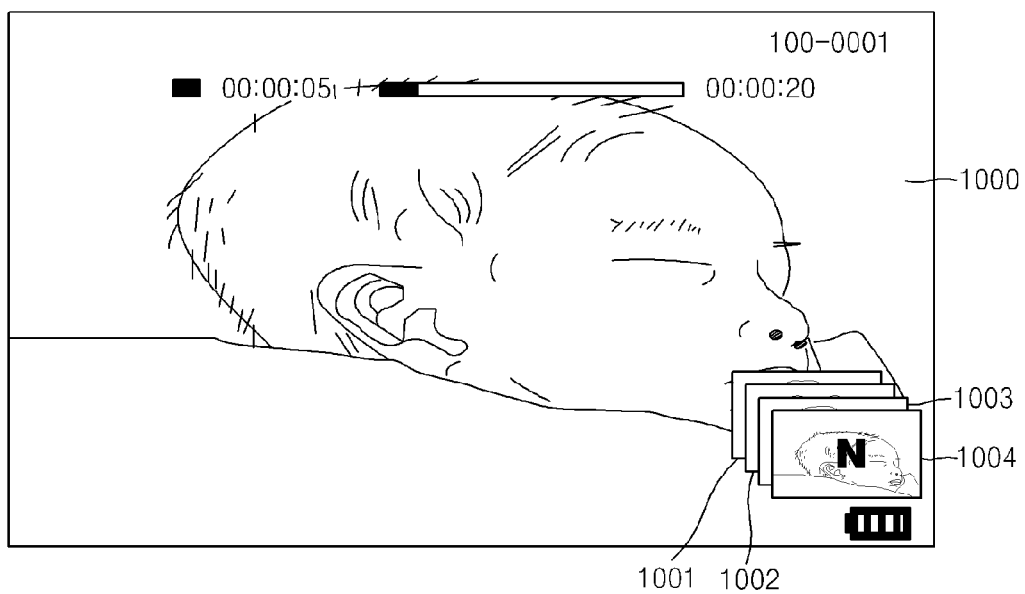

Referring to FIG. 8A, a moving image 800 is displayed on the first region and a thumbnail image 801 corresponding to a still image captured at 5 seconds is displayed on the second region. Referring to FIG. 8B, a thumbnail image 802 corresponding to a still image captured at 8 seconds overlaps onto the previously displayed thumbnail image 801. Referring to FIG. 8C, a thumbnail image 803 corresponding to a still image captured at 12 seconds overlaps onto the thumbnail images 801 and 802. Referring to FIG. 8D, a thumbnail image 804 corresponding to a still image captured lastly overlaps onto the thumbnail images 801 through 803.

Unlike FIGS. 8A through 8D, FIGS. 9A through 9D illustrate an example of when thumbnail images overlap in a leftward direction and when the number of displayed thumbnail images is not limited.

Unlike FIGS. 8A through 8D, FIGS. 10A through 10D illustrate an example of when thumbnail images overlap in a right downward direction and when the number of displayed thumbnail images is not limited.

In a display method and apparatus according to an embodiment of the invention, when the number of captured still images is increased, a user may check a total number of still images and may simultaneously view or compare the captured still images on one screen. As such, in order to check a timing when a dual-captured still image is captured and to check a total number of captured still images, a user may not experience inconvenience to individually select and check each still image file by stopping a moving image file.

The invention provides a display apparatus and method capable of intuitively displaying a moving image and still images related to the moving image on one screen.

The device described herein may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on the processor on a computer-readable medium. The computer readable recording medium may be non-transitory. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to example embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components or and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in the art without departing from the spirit and scope of the invention.

What is claimed is:

1. A display apparatus comprising:
a display controller configured to display a moving image on a first region of a display screen; and
a processor configured to generate a plurality of thumbnail images from a plurality of still images captured separately from capturing the moving image while capturing the moving image,
wherein the display controller is configured to display the plurality of thumbnail images on a second region of the display screen;
wherein a focus window is displayed on the second region by the display controller, and wherein each of the plurality of thumbnail images is automatically slid into the focus window by the display controller while the moving image is stopped or being played on the first region at a timing when one of the plurality of still images corresponding to the thumbnail image is captured;
wherein the display controller is configured to display the plurality of thumbnail images in the same size if the number of thumbnail images is equal to or less than a first number, and reduces the size of the plurality of thumbnail images if the number of thumbnail images is greater than the first number according to the size of the second region;
wherein a first slid thumbnail image of the plurality of thumbnail images is automatically slid from a first portion of the second region into the focus window at the timing when the still image corresponding to the first slid thumbnail image is captured and is automatically slid from the focus window to a second portion of the second region when a second slid thumbnail of the plurality of thumbnail images is automatically slid from the first portion of the second region into the focus window at a timing when the still image corresponding to the second slid thumbnail image is captured.

2. The display apparatus of claim 1, wherein the plurality of thumbnail images have the same size.

3. The display apparatus of claim 2, wherein the display controller is configured to display the plurality of thumbnail images in a rightward or leftward direction in an order of generating the plurality of thumbnail images.

4. The display apparatus of claim 1, wherein the plurality of thumbnail images do not have the same size.

5. The display apparatus of claim 1, wherein the moving image is stopped on the first region of the display screen.

6. The display apparatus of claim 1, wherein the display controller is configured to provide the focus window to one of the plurality of thumbnail images displayed on the second region so as to correspond to timings when the plurality of still images are captured.

7. The display apparatus of claim 1, wherein the focus window has a size greater than the size of the plurality of thumbnail images.

8. The display apparatus of claim 7, wherein the slid thumbnail image is enlarged to the size of the focus window.

9. The display apparatus of claim 6, wherein the focus window moves along the second region and is fixed at a last thumbnail image, and wherein thumbnail images next to the last thumbnail image are slid into the fixed focus window.

10. The display apparatus of claim 1, wherein the display controller is configured to display the plurality of thumbnail images in an overlapping manner.

11. The display apparatus of claim 1, wherein the display controller is configured to overlap the plurality of thumbnail images in an order of capturing the plurality of still images, and configured to display a thumbnail image corresponding to a lastly captured still image.

12. The display apparatus of claim 1, wherein the display controller is configured to maintain a certain number of overlapping thumbnail images.

13. The display apparatus of claim 1, wherein the display controller is configured to overlap the plurality of thumbnail images in an order of capturing the plurality of still images in a direction in which the moving image is played.

14. The display apparatus of claim 1, wherein the moving image is being played.

15. The display apparatus of claim 1, wherein, the display control is further configured to change a play position of the moving image to correspond to a timing when a still image corresponding to the selected thumbnail image is captured, if one of the plurality of thumbnail images displayed on the second region is selected.

16. A display apparatus comprising:
a display controller configured to display a moving image on a first region of a display screen; and
a processor configured to generate a plurality of thumbnail images from a plurality of still images captured separately from capturing the moving image while capturing the moving image,
wherein the display controller is configured to display while the moving image is stopped the plurality of thumbnail images on a second region of the display screen in an order of when the plurality of still images was captured;
wherein a focus window is displayed on the second region by the display controller, and wherein each of the plurality of thumbnail images is automatically slid into the focus window by the display controller while the moving image is stopped or being played on the first region at a timing when one of the plurality of still images corresponding to the thumbnail image is captured;
wherein the display controller is configured to display the plurality of thumbnail images in the same size if the number of thumbnail images is equal to or less than a first number, and reduces the size of the plurality of thumbnail images if the number of thumbnail images is greater than the first number according to the size of the second region;
wherein a first slid thumbnail image of the plurality of thumbnail images is automatically slid from a first portion of the second region into the focus window at the timing when the still image corresponding to the first slid thumbnail image is captured and is automatically slid from the focus window to a second portion of the second region when a second slid thumbnail of the plurality of thumbnail images is automatically slid from the first portion of the second region into the focus window at a timing when the still image corresponding to the second slid thumbnail image is captured.

17. A display apparatus comprising:
a display controller configured to display a moving image on a first region of a display screen; and
a processor configured to generate a plurality of thumbnail images from a plurality of still images captured separately from capturing the moving image while capturing the moving image,
wherein the display controller is configured to:
display the plurality of thumbnail images on a second region of the display screen in an order of when the plurality of still images were captured while the moving image is being played; and
display a focus window on the second region and provide the focus window to a thumbnail image corresponding to a play timing of the moving image;
wherein the focus window is displayed on the second region by the display controller, and wherein each of the plurality of thumbnail images is automatically slid into the focus window by the display controller while the moving image is stopped or being played on the first region at a timing when one of the plurality of still images corresponding to the thumbnail image is captured;
wherein the display controller is configured to display the plurality of thumbnail images in the same size if the number of thumbnail images is equal to or less than a first number, and reduces the size of the plurality of thumbnail images if the number of thumbnail images is greater than the first number according to the size of the second region;
wherein a first slid thumbnail image of the plurality of thumbnail images is automatically slid from a first portion of the second region into the focus window at the timing when the still image corresponding to the first slid thumbnail image is captured and is automatically slid from the focus window to a second portion of the second region when a second slid thumbnail of the plurality of thumbnail images is automatically slid from the first portion of the second region into the focus window at a timing when the still image corresponding to the second slid thumbnail image is captured.

18. A display method comprising:
displaying, by a display controller of a display apparatus, a moving image on a first region of a display screen;

generating, by a processor of the display apparatus, a plurality of thumbnail images from a plurality of still images captured separately from capturing the moving image while capturing the moving image; and displaying, by the display controller, the plurality of thumbnail images on a second region of the display screen;

displaying, by the display controller, a focus window on the second region, and wherein each of the plurality of thumbnail images is automatically slid into the focus window by the display controller while the moving image is stopped or being played on the first region at a timing when one of the plurality of still images corresponding to the thumbnail image is captured;

wherein the display controller is configured to display the plurality of thumbnail images in the same size if the number of thumbnail images is equal to or less than a first number, and reduces the size of the plurality of thumbnail images if the number of thumbnail images is greater than the first number according to the size of the second region;

wherein a first slid thumbnail image of the plurality of thumbnail images is automatically slid from a first portion of the second region into the focus window at the timing when the still image corresponding to the first slid thumbnail image is captured and is automatically slid from the focus window to a second portion of the second region when a second slid thumbnail of the plurality of thumbnail images is automatically slid from the first portion of the second region into the focus window at a timing when the still image corresponding to the second slid thumbnail image is captured.

19. The display method of claim 18, wherein displaying the plurality of thumbnail images comprises:

displaying the plurality of thumbnail images on a second region of the display screen in an order of when the plurality of still images were captured and wherein each of the plurality of thumbnail images is displayed at a time during the displaying of the moving image when the still image corresponding to the thumbnail image was captured.

20. The display method of claim 19, wherein displaying the plurality of thumbnail images further comprises: displaying the plurality of thumbnail images in a smaller size if the plurality of thumbnail images cannot be displayed in the second region of the display screen in a current size.

* * * * *